United States Patent
Tanaka

(10) Patent No.: US 6,330,045 B1
(45) Date of Patent: Dec. 11, 2001

(54) LIQUID-CRYSTAL DISPLAY DEVICE WITH A GASKET FOR CONTROLLING THERMAL GRADIENT WITHIN THE DEVICE

(75) Inventor: Hideki Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/503,951

(22) Filed: Feb. 14, 2000

(30) Foreign Application Priority Data

Feb. 16, 1999 (JP) .................................................. 11-037427

(51) Int. Cl.⁷ .................................................. G02F 1/1333
(52) U.S. Cl. .................................................. 349/58; 349/60
(58) Field of Search .................................................. 349/58–60

(56) References Cited

U.S. PATENT DOCUMENTS

| | | | |
|---|---|---|---|
| 3,718,382 | * 2/1973 | Wysocki et al. | 350/160 LC |
| 3,994,568 | * 11/1976 | King et al. | 350/160 LC |
| 4,316,254 | * 2/1982 | Levin et al. | 364/481 |
| 4,907,859 | * 3/1990 | Takada et al. | 350/331 T |
| 5,479,285 | * 12/1995 | Burke | 359/83 |
| 5,486,942 | * 1/1996 | Ichikawa et al. | 359/83 |
| 5,539,552 | * 7/1996 | Desai et al. | 359/66 |
| 5,748,269 | * 5/1998 | Harris et al. | 349/58 |
| 5,748,270 | * 5/1998 | Smith | 349/69 |
| 6,106,120 | * 8/2000 | Menard | 353/119 |
| 6,151,207 | * 11/2000 | Kim | 361/681 |

FOREIGN PATENT DOCUMENTS

| | | | |
|---|---|---|---|
| 2-210325 | 8/1990 | (JP) | G02F/1/133 |
| 5-889916 | 4/1993 | (JP) | H01R/9/07 |
| 5-333362-A | * 12/1993 | (JP) | . |
| 3-001011 | 6/1994 | (JP) | G02F/1/1333 |
| 6-350282 | 12/1994 | (JP) | H05K/9/00 |
| 7-10727 | 2/1995 | (JP) | G05F/1/1335 |
| 8-15674 | 1/1996 | (JP) | G02F/1/1333 |
| 8-146396 | 6/1996 | (JP) | G02F/1/1333 |
| 9-318940 | 12/1997 | (JP) | G02F/1/1335 |
| 9-318940-A | * 12/1997 | (JP) | . |
| 10-232385 | 9/1998 | (JP) | G02F/1/133 |
| 10-254366 | 9/1998 | (JP) | G09F/9/00 |
| 10-333173 | 12/1998 | (JP) | G02F/1/1345 |

\* cited by examiner

Primary Examiner—William L. Sikes
Assistant Examiner—Tarifur R. Chowdhury
(74) Attorney, Agent, or Firm—Hayes, Soloway, Hennessey, Grossman & Hage P.C.

(57) ABSTRACT

In a liquid-crystal display device comprising a liquid-crystal display panel, a light source provided in proximity to the liquid-crystal display panel for illuminating the liquid-crystal display panel, a transformer of the light source provided in proximity to the liquid-crystal display panel, and an enclosure for housing the liquid-crystal display panel, the light source and the transformer, a gasket is provided between the liquid-crystal display panel and the enclosure for controlling a thermal gradient of the liquid-crystal display panel.

14 Claims, 8 Drawing Sheets

EQUIVALENT CIRCUIT INCLUDING GASKET

TEMPERATURE MEASUREMENT POINTS

TEMPERATURE CHANGE ACCORDING TO THE PRESENT INVENTION

TEMPERATURE CHANGE OF A CONVENTIONAL DEVICE

LIQUID-CRYSTAL DISPLAY DEVICE WITH A GASKET FOR CONTROLLING THERMAL GRADIENT WITHIN THE DEVICE

BACKGROUND OF THE INVENTION

1. Field of the Invention The present invention relates to a liquid-crystal display device and more particularly to a liquid-crystal display device with no display variations caused by heat.

2. Background of the Invention

As shown in FIG. 11, in a notebook-size personal computer having a narrow frame construction, heat generated from an inverter such as shown in FIG. 12 directly influences on display quality of the liquid-crystal display panel.

This is because, within an enclosure of a notebook-size personal computer designed with a narrow frame, the inverter and the liquid-crystal display panel are quite close to each other, the distance between them being virtually zero.

In a liquid-crystal display device configured in this manner, there are elements such as reflective sheets, and thin optical system sheets which have a small thermal capacity.

When a Liquid-crystal display device is driven, the heat generated by the inverter heats only a part of the liquid-crystal display panel. For this reason, a difference in thermal expansion speed occurs between a reflective sheet and the chassis, the reflective sheet, having a smaller thermal capacity, expanding to a greater degree and more quickly, so that it strikes the chassis.

For this reason, wrinkles occur in the sheet, leading to an abnormal screen display.

According, it is an object of the present invention, in view of the above-noted problems in the prior art, to provide a solution to these problems, by providing a novel liquid-crystal display device, in which the difference in thermal expansion speed between the liquid-crystal display panel and a reflective sheet provided on the rear surface thereof is made small, thereby reducing the unevenness in the display.

The Japanese Utility Model No. 3001011 discloses liquid-crystal display device. However, this device is different from the present invention in terms of problem to be solved and constitution thereof.

SUMMARY OF THE INVENTION

In order to achieve the above-noted objects, the present invention has the following basic technical constitution.

A first aspect of the present invention is a liquid-crystal display device having a liquid-crystal display panel, a light source provided in proximity to the liquid-crystal display panel for illuminating the liquid-crystal display panel, transformer of the light source provided in proximity to the liquid-crystal display panel, and an enclosure for housing the liquid-crystal display panel, the light source and the transformer, a gasket is provided between the liquid-crystal display panel and the enclosure for controlling a thermal gradient of the liquid-crystal display panel.

In a second aspect of the present invention, the gasket is disposed in proximity to the light source.

In a third aspect of the present invention, the gasket is made of a foam material with resilience and covered with an electrically conductive material.

In a fourth aspect of the present invention, the thermal capacity of the gasket satisfies the following relationship.

$$\frac{Q'_4}{\frac{dT_4}{dt}} < C_4 \leq \frac{\int (Q_2 - Q_4 + Q'_4) dt}{\int \frac{dT_4}{dt} dt}$$

where $C_4$ is the thermal capacity of said enclosure, $Q_2$ is a heat flow between an air layer in said enclosure and said liquid-crystal display panel, $Q_4$ is a heat flow between said gasket and said enclosure, $Q'_4$ is a heat flow between said gasket and an air layer in said enclosure, and $T_4$ is a temperature of said gasket.

In a liquid-crystal display device configured as noted above, when the inverter is started to drive the liquid-crystal display device, there is a sudden generation of heat from the transformer, this heat being transmitted to the liquid-crystal display panel.

However, because the gasket acts to reduce the speed of the temperature change in the liquid-crystal display panel, the speed of temperature change in a reflective sheet and a chassis also is reduced. For this reason, thermal expansion speed difference between a reflective sheet and a chassis reduces due to differences in thermal capacity, and the reflective sheet does not strike the chassis. Therefore, wrinkling of the reflective sheet is eliminated, and abnormal display is prevented.

DESCRIPTION OF THE PREFERRED EMBODIMENTS

Preferred embodiments of a liquid-crystal display device according to the present invention are described in detail below, with references being made to relevant accompanying drawings.

Figure 1:
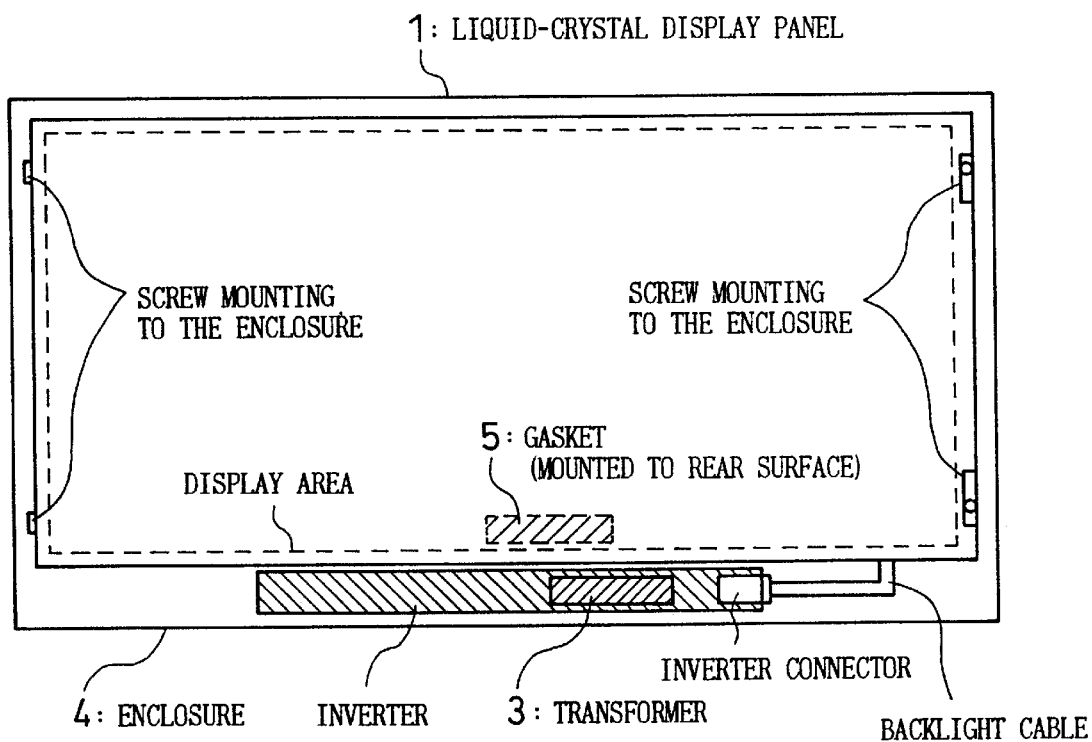
FIG. 1 is a drawing showing the placement of a gasket of a liquid-crystal display panel according to the present invention.
Figure 2:
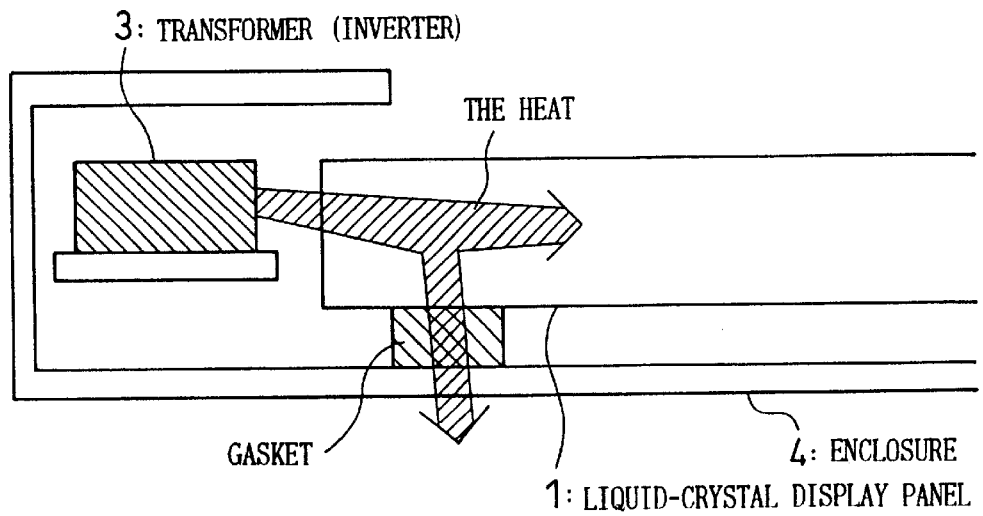
FIG. 2 is a drawing showing the transfer of heat when a gasket is used.
Figure 3:
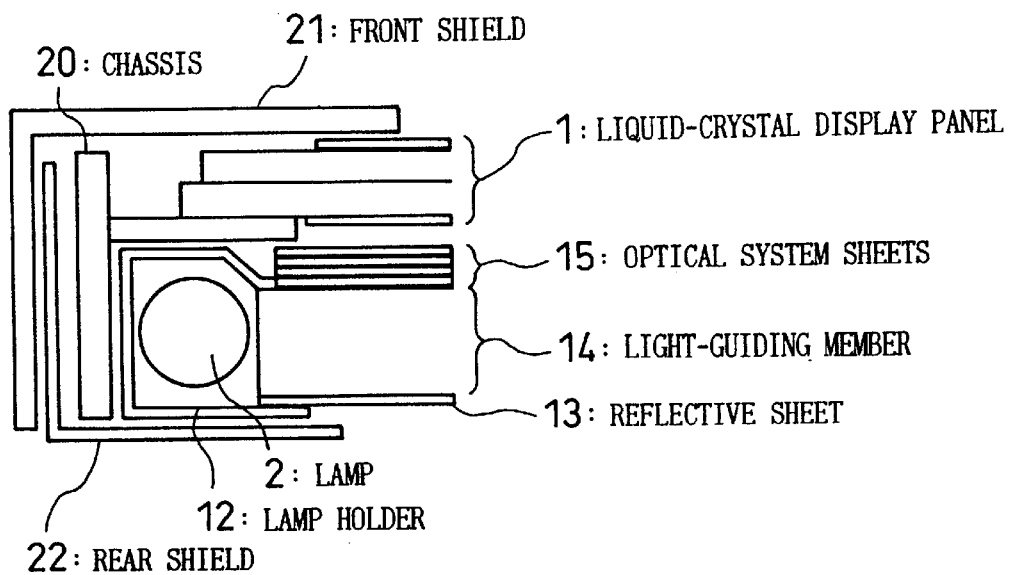
FIG. 3 is a cross-section view of a liquid-crystal display panel according to the present invention.

FIG. 1 through FIG. 3 show the configuration of a liquid-crystal display device for controlling heat in a liquid-crystal display device according to an embodiment of the present invention.

These drawings show a liquid-crystal display device having a liquid-crystal display panel 1, a light source provided in proximity to the liquid-crystal display panel 1 for illuminating the liquid-crystal display panel 1, and a transformer 3 for the light source 2 provided in proximity to the liquid crystal display panel 1, and an enclosure for mousing the liquid-crystal display panel 1, the light source 2 and the transformer 3. In this liquid-crystal display device, a gasket 5 is provided between the liquid-crystal display panel 1 and the enclosure 4, the gasket 5 controls a thermal gradient of said liquid-crystal display panel 1.

In the above-noted liquid-crystal display device, the gasket 5 can alternately be provided in proximity to the light source 2.

The gasket 5 is preferably made of a foam material having resilience, which is covered by a an electrically conductive material.

The present invention is described in further detail below.

A liquid-crystal display device according to the present invention, as shown in the cross-section view of FIG. 3, is generally made up of a liquid-crystal display panel, a backlight (backlighting light source and backlight unit), and some sheet metal elements. The constituent elements includes a lamp 2, a lamp holder 13, a reflective sheet 13, a light-guiding sheet 14, a optical system sheet 15 made up of one to four layers which serve as lens sheets and diffusion sheets, and a backlight chassis 20.

The sheet metal elements of the above-noted liquid-crystal display device comprise a front shield plate 21 and a rear shield plate 22.

FIG. 1 shows the placement of the gasket in the present invention.

The gasket 5 is placed in proximity to the transformer 3, so as to come into contact with the rear of the liquid-crystal display panel 1 and the enclosure 4. In the present invention, the gasket is adhered to the rear shield plate 22.

The size of the gasket used in the present invention is approximately the same as the inverter transformer 3, this having a length of 45 mm, a width of 10 mm, and thickness of 5.5 mm.

In a liquid-crystal display device configured in the above-noted manner, when there is a heat-generating body such as an inverter within the enclosure 4, the influence on the liquid-crystal display panel (abnormal display caused by sheet wrinkling) of heat generated by the inverter is suppressed by using the gasket 5.

In a liquid-crystal display device configured in this manner, when part of the liquid-crystal display panel is suddenly heated, because of the difference in thermal capacity between the reflective sheet and the chassis, a difference occurs in the speed of thermal expansion.

This difference in thermal expansion is alleviated by the achievement of thermal equilibrium. By providing a gasket at the part of the liquid-crystal display panel subjected to sudden heating, the speed of temperature change is limited, thereby reducing the difference in the speed of thermal expansion between the reflective sheet and the chassis, and preventing the occurrence of wrinkles in the reflective sheet, which prevents an abnormal display.

By taking the above-noted heat radiation measure, grounding to the enclosure is improved, thereby simultaneously improving immunity to EMI at a cost that is lower than the case of providing separate EMI countermeasures.

Because a hole is not made in the enclosure for direct heat radiation from he inverter, safety is improved by preventing exposure of high-voltage parts.

The following is a thermal analysis performed using a thermal circuit network.

Figure 4:
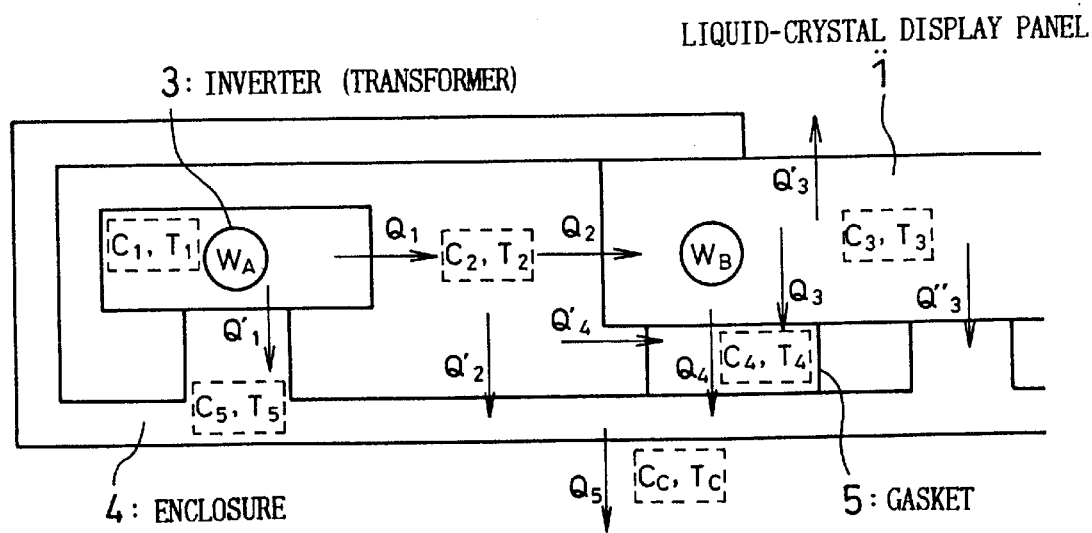
FIG. 4 is a drawing showing the thermal circuit network for the case in which a gasket is used.
Figure 14:
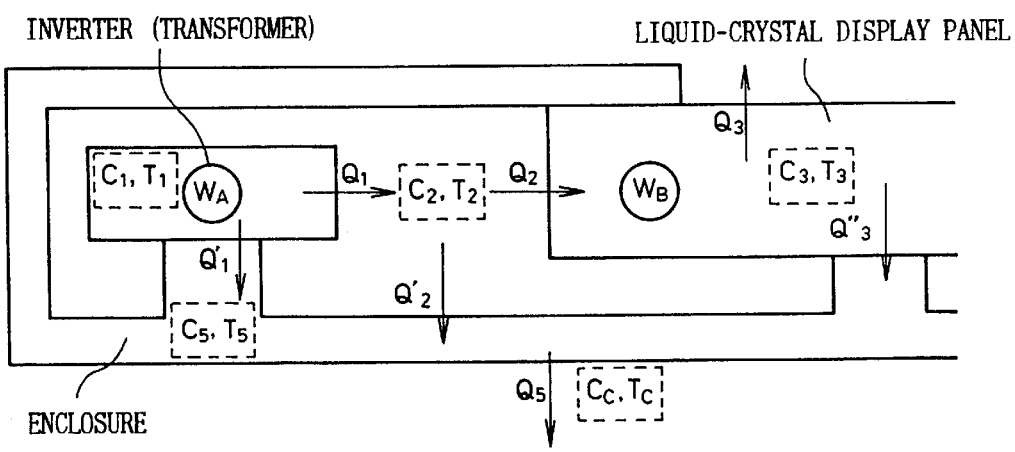
FIG. 14 is a drawing showing a thermal circuit network of a liquid-crystal display panel of the past.

Consider the models shown in FIG. 4 and FIG. 14.

FIG. 4 is a thermal network circuit in the case in which a gasket is used, and FIG. 14 is a thermal circuit network for the prior art case, in which no gasket is used.

Figure 5:
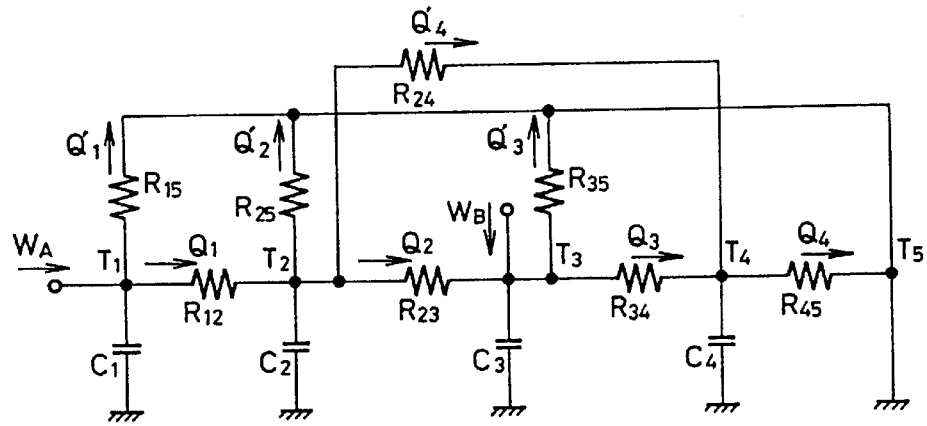
FIG. 5 is an equivalent circuit for the case in which a gasket is used.
Figure 15:
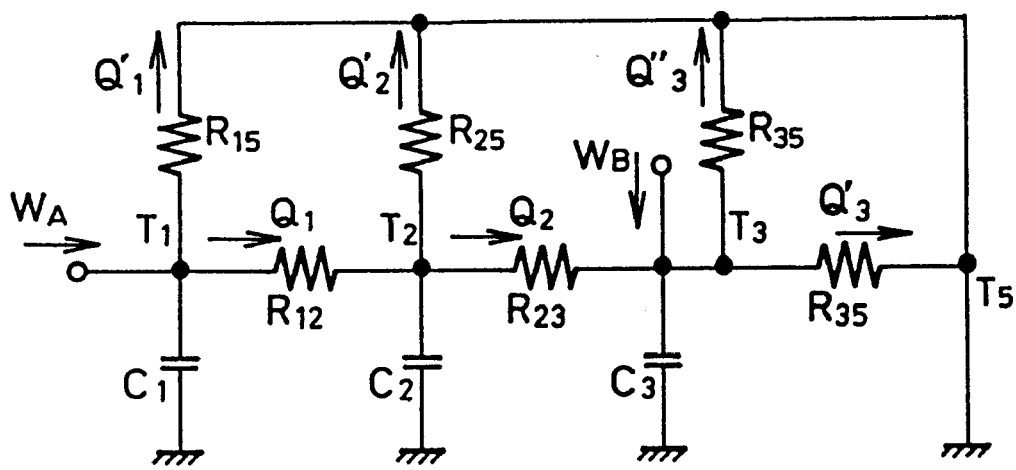
FIG. 15 is an equivalent circuit of FIG. 14.

The above-noted thermal circuit networks can be expressed as the electrical circuits shown in FIG. 5 and FIG. 15. Considering the hermetically sealed space in the enclosure, the temperature of the enclosure is taken as approximating room temperature.

The thermal circuit network in the case in which as gasket is used, can be represented by the following relationships.

$$Q_1 \cdot R_{12} = T_1 - T_2 \tag{1}$$

$$Q'_1 \cdot R_{15} = T_1 - T_5 \tag{2}$$

$$Q_2 \cdot R_{23} = T_2 - T_3 \tag{3}$$

$$Q'_2 \cdot R_{25} = T_2 - T_5 \tag{4}$$

$$Q_3 \cdot R_{34} = T_3 - T_4 \tag{5}$$

$$Q'_3 \cdot R_{35} = T_3 - T_5 \tag{6}$$

$$Q_4 \cdot R_{4S} = T_4 - \tag{7}$$

$$Q'_4 \cdot R_{24} = T_2 - T_4 \tag{8}$$

$$C_1 \cdot \frac{dT_1}{dt} = W_A - Q_1 - Q'_1 \tag{9}$$

$$C_2 \cdot \frac{dT_2}{dt} = Q_1 - Q_2 - Q'_2 - Q'_4 \tag{10}$$

$$C_3 \cdot \frac{dT_3}{dt} = W_B + Q_2 - Q_3 - Q''_3 \tag{11}$$

$$C_4 \cdot \frac{dT_4}{dt} = Q_3 - Q_4 - Q'_4 \tag{12}$$

The construction of the prior art, can be represented by the following relationships.

$$Q_1 \cdot R_{12} = _{T1} - T_2 \tag{13}$$

$$Q'_1 \cdot R_{15} = T_1 - T_5 \tag{14}$$

$$Q_2 \cdot R_{23} = T_2 - T_3 \tag{15}$$

$$Q'_2 \cdot R_{25} = T_2 - T_5 \tag{16}$$

$$Q''_3 \cdot R_{35} = T_3 - T_5 \tag{17}$$

$$C_1 \cdot \frac{dT_{10RG}}{dt} = W_A - Q_1 - Q'_1 \tag{18}$$

$$C_2 \cdot \frac{dT_{20RG}}{dt} = Q_1 - Q_2 - Q'_2 \tag{19}$$

$$C_3 \cdot \frac{dT_{30RG}}{dt} = W_B + Q_2 - Q''_3 \tag{20}$$

In the above, R represents thermal resistance, w represents generated heat amount, Q represents heat flow, and T represents temperature. More specifically:

$R_{12}$ is the thermal resistance between the transformer and an air layer inside the enclosure.

$R_{15}$ is the thermal resistance between the transformer and the enclosure.

$R_{23}$ is the thermal resistance between the air layer in the enclosure and the liquid-crystal display panel.

$R_{25}$ is the thermal resistance between the air layer in the enclosure and the enclosure.

$R_{34}$ is the thermal resistance between the liquid-crystal display panel and the gasket.

$R_{35}$ is the thermal resistance between the liquid-crystal display panel and the enclosure.

$R_{45}$ is the thermal resistance between the gasket and the enclosure.

$R_{42}$ is the thermal resistance between the gasket and the air layer in the enclosure.

$C_1$ is the thermal capacity of the transformer.

$C_2$ is the thermal capacity of the air layer in the enclosure.

$C_3$ is the thermal capacity of the liquid-crystal display panel.

$C_4$ is the thermal capacity of the enclosure.

$W_A$ is the amount of heat generated by the transformer.

$W_B$ is the amount of heat generated by the lamp within the liquid-crystal display panel.

$Q_1$ is the heat flow between the transformer and the air layer in the enclosure.

$Q'_1$ is the heat flow between the transformer and the enclosure.

$Q_2$ is the heat flow between the air layer in the enclosure and the liquid-crystal display panel.

$Q'_2$ is the heat flow between the air layer in the enclosure and the enclosure.

$Q_3$ is the heat flow between the liquid-crystal display panel and the gasket.

$Q''_3$ is the heat flow between the liquid-crystal display panel and the enclosure.

$Q_4$ is the heat flow between the gasket and the enclosure.

$Q'_4$ is the heat flow between the gasket and the air layer in the enclosure.

$T_1$ is the temperature of the transformer.

$T_2$ is the temperature of the air layer in the enclosure.

$T_3$ is the temperature of the liquid-crystal display panel.

$T_4$ is the temperature of the gasket.

$T_5$ is the temperature of the enclosure (room temperature).

The thermal resistance between the transformer and the enclosure and the thermal resistance between the liquid-crystal display panel and the enclosure are usually extremely high.

From this fact, it can be seen that $R_{15} \gg R_{12}$ and $R_{35} \gg R_{34}$.

From the above-noted relationships, we have following equations, $$Q_1 = \frac{T_1 - T_2}{R_{12}} \gg Q'_1 \quad \text{(from Equations (1) and (2))}$$

$$= \frac{T_1 - T_5}{R_{15}} \approx 0$$

and $$Q_3 = \frac{T_3 - T_4}{R_{34}} \gg Q'_3 \quad \text{(from Equations (5) and (6))}$$

$$= \frac{T_3 - T_5}{R_{35}} \approx 0$$

Because of the above relationships, the previously given equations (9), (11), (18), and (20) can be approximated as follows.

$$C_1 \cdot \frac{dT_1}{dt} \approx W_A - Q_1 \tag{9'}$$

$$C_3 \cdot \frac{dT_3}{dt} \approx W_B + Q_2 - Q_3 \tag{11'}$$

$$C_1 \cdot \frac{dT_{1ORG}}{dt} \approx W_A - Q_1 \tag{18'}$$

$$C_3 \cdot \frac{dT_{3ORG}}{dt} \approx W_B + Q_2 \tag{20'}$$

From equations (11') and (20'), we have the following.

$$\frac{dT_3}{dt} = \frac{W_B + Q_2 - Q_3}{C_3} < \frac{dT_{3ORG}}{dt} = \frac{W_B + Q_2}{C_3} \tag{21}$$

This is because of the difference caused by the "$Q_3$" term in equation (11').

From the above, in the case in which a gasket is used, compared to the structure used in the past, it is possible to reduce the speed of the temperature change in the liquid-crystal display panel.

With the structure used in the past, because the speed of the temperature rise was high, the thermal expansion of the chassis 20 could not keep up with the thermal expansion of the reflective sheet 13. For this reason, the reflective sheet expanded more than the chassis, so that wrinkles developed in the sheet.

If the gasket 5 is used, however, it is possible to reduce the speed of the temperature change in the liquid-crystal display panel, so that the temperature rise of the reflective sheet 13 and the chassis 20 is gradual, thereby causing thermal expansion at a rate at which wrinkles in the sheet do not occur.

For this reason, even if the liquid-crystal display panel 1 is heated by heat generated by the transformer 3, sheet wrinkling does not cause an abnormal display.

Equation (12) can be rewritten as follows.

$$Q_3 = C_4 \cdot \frac{dT_4}{dt} + Q_4 - Q'_4 \tag{12'}$$

Equation (11') can be rewritten as follows.

$$C_3 \cdot \frac{dT_3}{dt} \approx W_B + Q_2 - C_4 \cdot \frac{dT_4}{dt} - Q_4 + Q'_4 \tag{11'}$$

If the thermal capacity $C_4$ is made small, the third term on the right side of equation (11') becomes small, so that the negative term that makes the temperature rate of change slow becomes small. By doing this, the rate of change $dT_3/dt$ of the temperature $T_3$ of the liquid-crystal display panel becomes large.

Therefore, the rate of change of the temperature within the liquid-crystal display panel including a reflective sheet becomes fast, leading to the danger of wrinkling of the sheet.

Because of this situation, it is not possible to make $C_4$ small.

For this reason, in comparing equation (20') for the structure of the past with equation (12') for the present invention, it is necessary to make the value of $dT_3/dt$ smaller for the latter than the former, as a condition for the thermal capacity $C_4$. This leads to the condition of $Q_3>0$ which, when substituted into equation (12'), yields the following conditional relationship.

$$Q'_4 - Q_4 < C_4 \cdot \frac{dT_4}{dt} \quad (22)$$

If a comparison is made of the temperature reached when the liquid-crystal display panel is used alone (that is, with absolutely no influence from the enclosure or the inverter) with case in which the enclosure and inverter exert their influences, we have the following.

$$\int \frac{dT_{3ALONE}}{dt} dt = \int \frac{W_B - Q'_3}{C_3} dt \quad (23)$$

$$\int \frac{dT_3}{dt} dt = \int \frac{W_B + Q_2 - Q'_3 - C_4 \cdot \frac{dT_4}{dt} - Q_4 + Q'_4}{C_3} dt \quad (24)$$

(the present invention)

In the above, $Q'_3$ is the amount of heat flow between the liquid-crystal display panel and he outside air.

If the temperature reached is lower than the temperature for the case of stand-alone operation, because of the reduced liquid-crystal display panel temperature, the lamp of the backlighting unit in the liquid-crystal display panel also experiences a reduction in temperature.

Because of the reduction in the temperature reached by the lamp, the light-emitting efficiency of the lamp is reduced, leading to the danger of a reduction in light intensity.

For this reason, it is not possible to reduce the temperature reached by the liquid-crystal display panel of the present invention to lower than the temperature reached by the liquid-crystal display panel when operating alone.

From this, the following relationship is obtained.

$$\int \frac{dT_{3ALONE}}{dt} dt \leq \int \frac{dT_3}{dt} dt$$

Therefore, from equations (23) and (24), we can determine the following relationship.

$$\int \frac{Q_2 - C_4 \cdot \frac{dT_4}{dt} - Q_4 + Q'_4}{C_3} dt \geq 0 \quad (25)$$

By rearranging this equation, we have the following.

$$\int C_4 \frac{dT_4}{dt} dt \leq \int (Q_2 - Q_4 + Q'_4) dt$$

In the above relationship, the condition for the thermal capacity $C_4$ is determined as follows.

$$C_4 \leq \frac{\int (Q_2 - Q_4 + Q'_4) dt}{\int \frac{dT_4}{dt} dt} \quad (26)$$

Thus, the condition for the thermal capacity $C_4$, from equations (22) and (26), is determined as follows.

$$\frac{Q'_4}{\frac{dT_4}{dt}} < C_4 \leq \frac{\int (Q_2 - Q_4 + Q'_4) dt}{\int \frac{dT_4}{dt} dt} \quad (27)$$

Therefore, it is necessary that an object mounted to the rear of the liquid-crystal display panel 1 have a small thermal resistance, and a value of thermal capacity $C_4$ that satisfies the condition given by (27).

If metal is used in place of the gasket in the present invention, although the thermal resistance can be made small, the thermal capacity becomes large.

In this case, if the size of the metal is reduced, so that the surface area is adjusted so as to achieve a small thermal capacity, the thermal resistance will grow large (that is, heat will not be easily transferred, because of the small contact with the liquid-crystal display panel), the result being that the condition of (27) will not be satisfied.

The gasket used in the present invention is a made of a foam material with resilience covered ba an electrically conductive material, and satisfies the above-noted condition with respect to thermal capacity, the actual gasket selected by 45 mm long, 10 mm wide, and having a thickness of 5.5 mm.

The actual temperature change in the liquid-crystal display panel was measured, using the configuration shown in FIG. 1.

Figure 6:
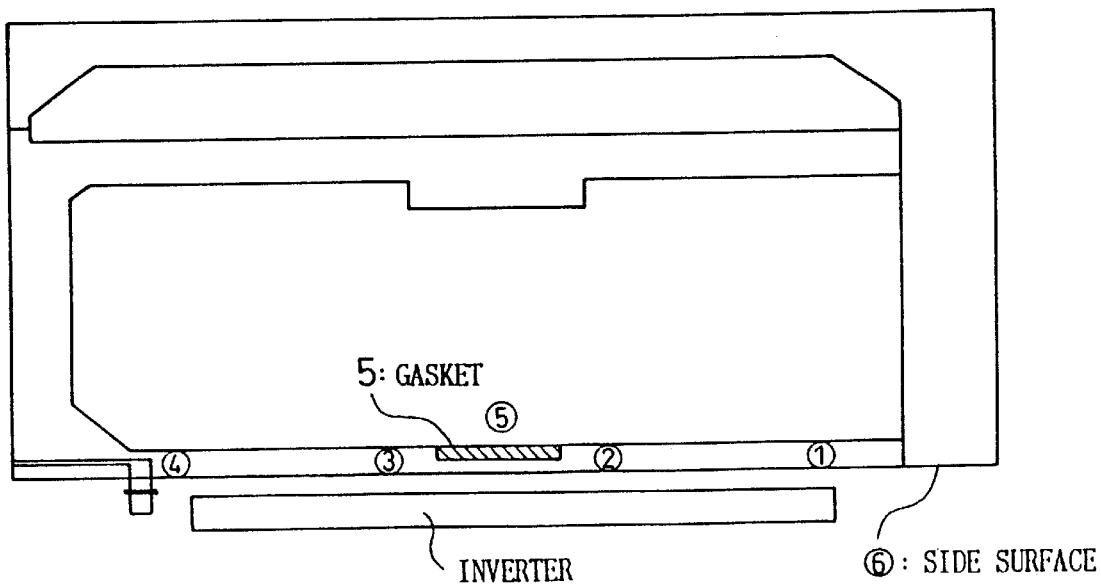
FIG. 6 is a drawing showing the temperature measurement points.

The points at which the temperature was measured are shown in FIG. 6. Of the measurement points, the temperature change of the reflective sheet was observed (the point marked ⑤ in FIG. 6 being the point at which this temperature change was measured). As can be seen from FIG. 6, the reflective sheet measurement point is closer to the center of the liquid-crystal display panel than the position of the gasket in the present invention. That is, the temperature variations of the reflective sheet at a position that is more distant from the inverter, is measured.

Figure 7:
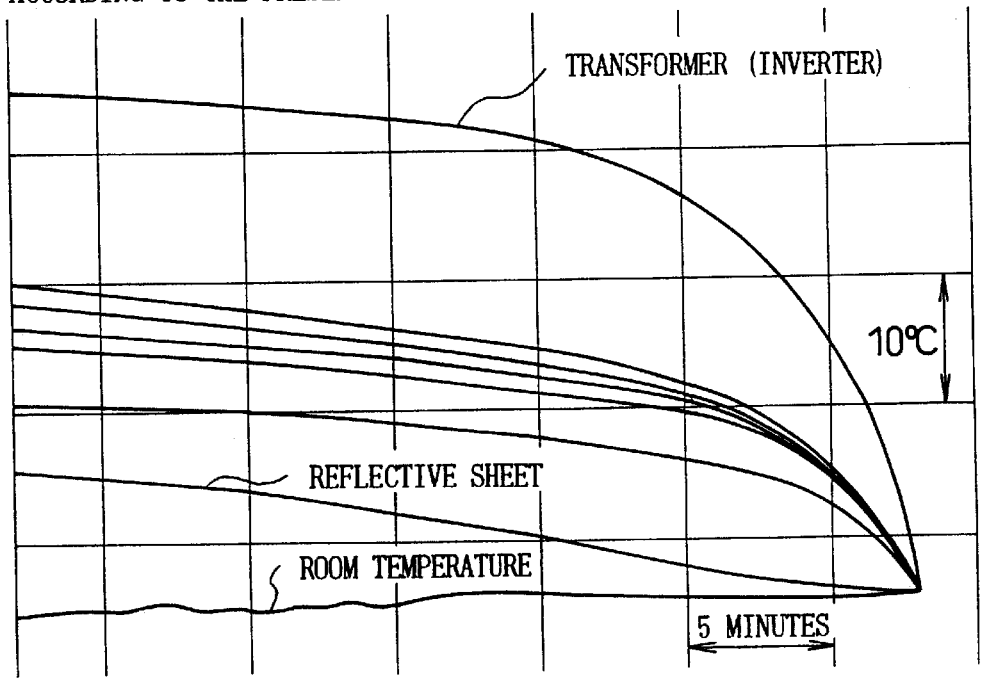
FIG. 7 is a graph showing the temperature change in various parts of a liquid-crystal display panel according to the present invention.
Figure 8:
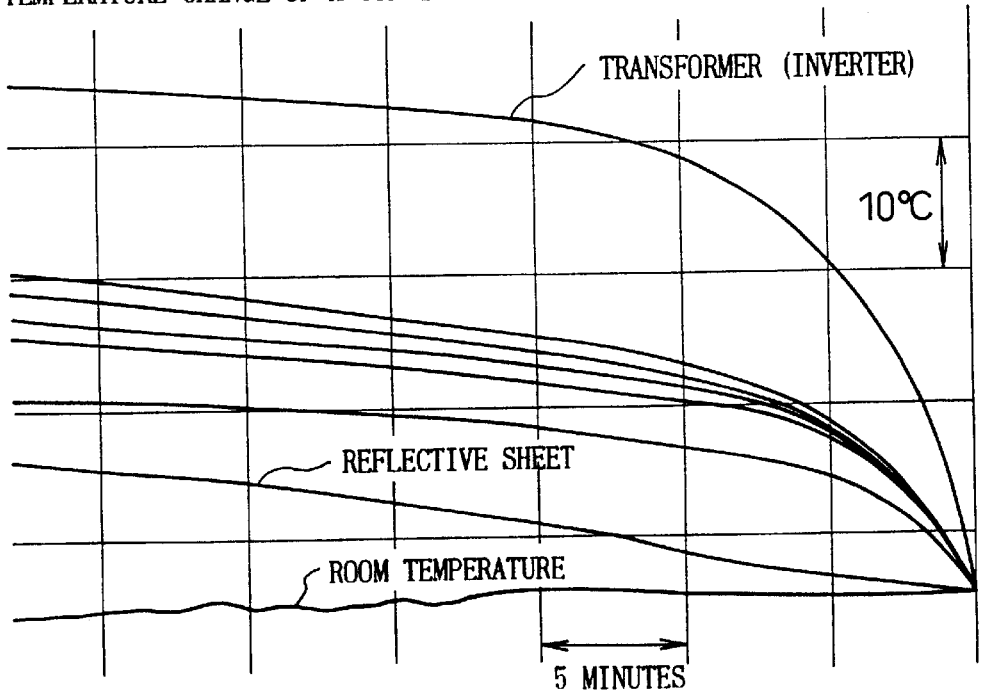
FIG. 8 is a graph showing the temperature change in various parts of a liquid-crystal display panel according to the prior art.

FIG. 8 shows the temperature change with no countermeasures, as in the prior art, and FIG. 7 shows the temperature change when using the countermeasure of the present invention.

To verify the effect of the present invention, the gasket used in the experiment was of the size noted earlier.

From the measurement results, if the rate of temperature rise is determined, it is seen that, in contrast to the prior art, in which the rate is 0.22° C. minute from the turn on time of the inverter, in the case of the present invention, the temperature change is 0.13° C. /minute from the turn on time of the inverter, this representing a reduction in the speed of temperature rise of approximately 60%.

From these results, it was verified that the speed of temperature rise of the reflective sheet (part that is farther than the gasket from the inverter) as shown in by the curve on the graph is suppressed over the time of 0 to 20 minutes.

Because there is no abnormal screen display, it was verified that the present invention achieves its intended effect in terms of display condition as well.

Figure 9:
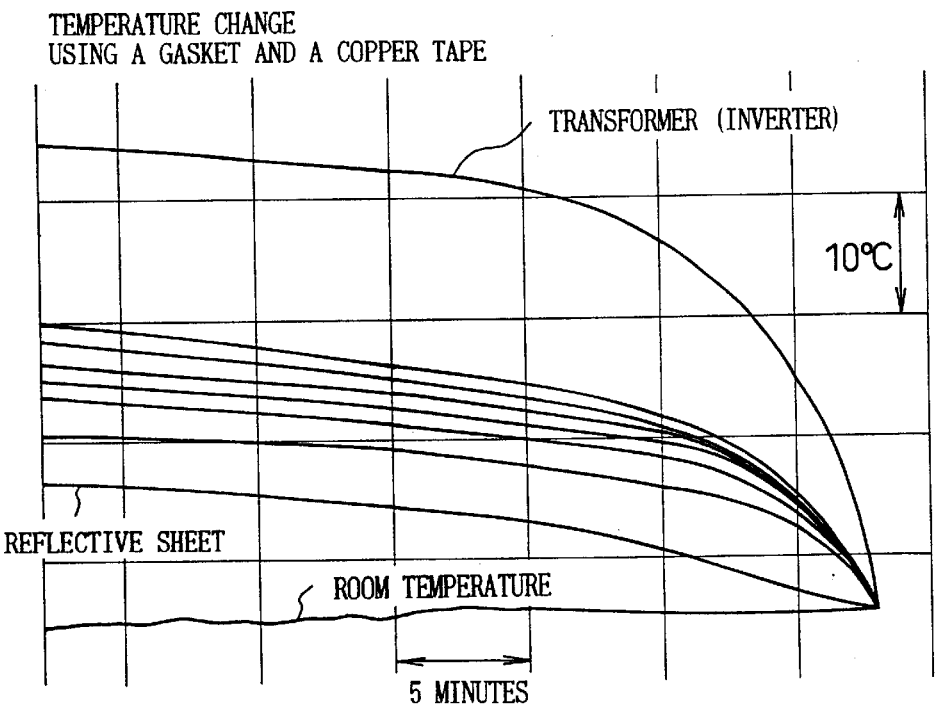
FIG. 9 is a graph showing the temperature change in various parts of a liquid-crystal display panel when copper tape is used as the gasket.

The measurement results show in FIG. 9 are for the case in which a copper tape having a length of 45 mm, a width or 18 mm, and a thickness of 0.12 mm is adhered between the liquid-crystal display panel and the enclosure in place of the gasket.

If the rate of temperature rise is determined from these measurement results, it is seen that the temperature rises at a rate of 0.50° C./minute for the 10-minute period starting when the inverter is turned on (more than double the rate of exhibited in the prior art).

This can be explained as follows.

Because the thermal capacity $C_4$ of the copper tape is small, the effect of the positive term on the right side of equation (12') becomes small, so that the condition $Q_3<0$ occurs. This is because of the increase in the size of the right side of equation (11'), the time variation $dT_3/dt$ of the temperature $T_3$ of the liquid-crystal display panel becomes larger than before the countermeasure is taken (that is, the speed of temperature rise of the liquid-crystal display panel is greater than the case of the prior art).

It is therefore not possible to achieve the object of the present invention of reducing the speed of temperature rise, and in fact this results in an increase in the temperature rate of increase. In actuality, because display variations (unevenness) occurs because of wrinkling of the reflective sheet, there is almost no difference from the prior art in terms of display appearance.

That is, it can been seen that, with a copper tape of the above-noted dimensions, it is not possible to achieve the effect of limiting the speed of temperature rise in the liquid-crystal display panel.

Figure 10:
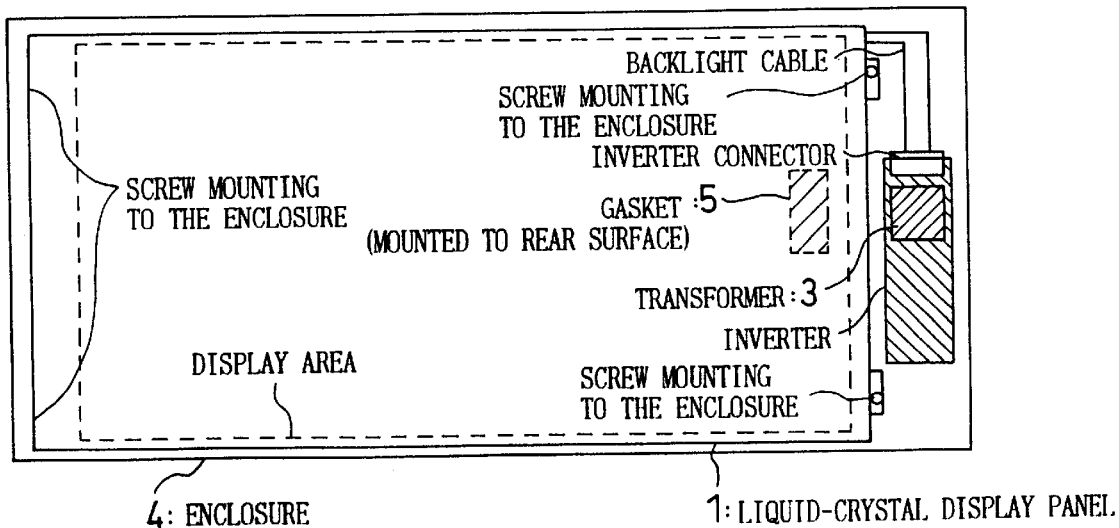
FIG. 10 is a drawing showing another embodiment of the present invention.
Figure 11:
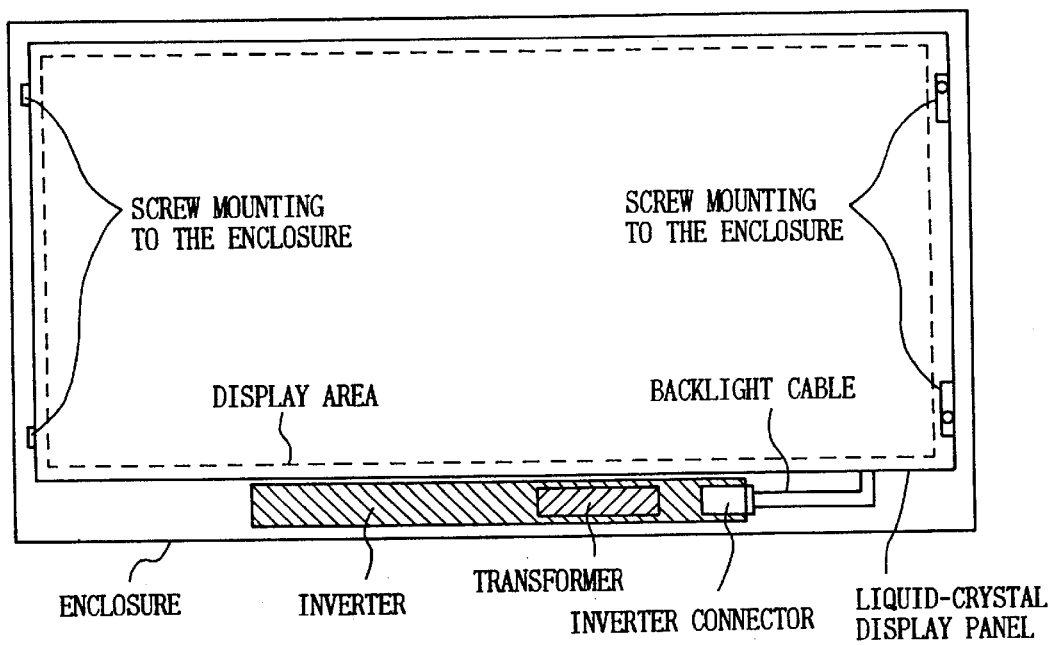
FIG. 11 is a drawing showing the configuration of a liquid-crystal display panel of the past.
Figure 12:
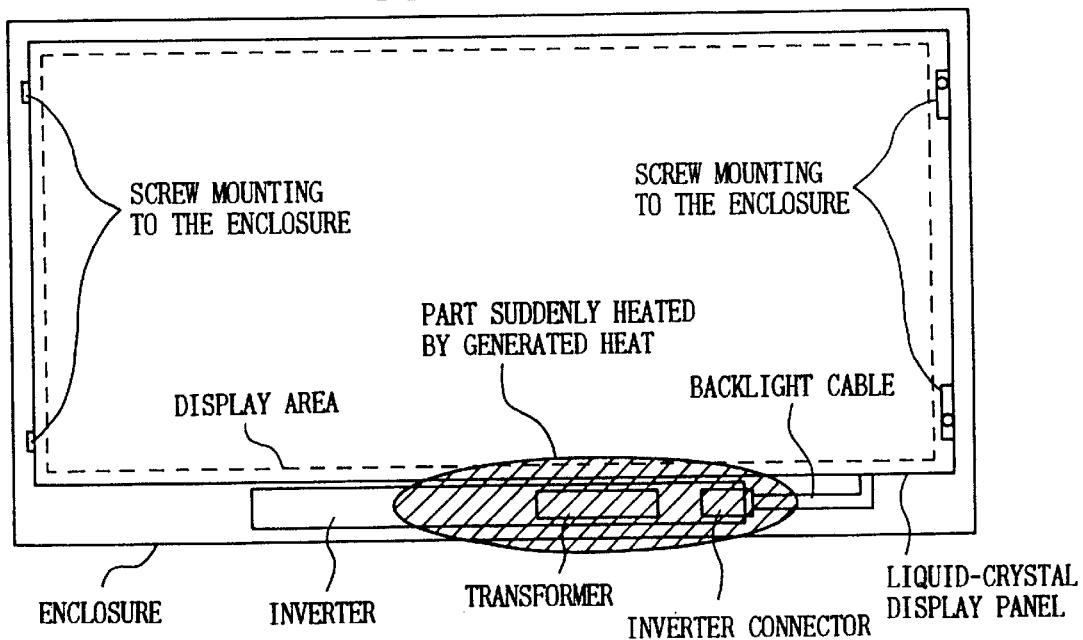
FIG. 12 is a drawing showing a part of a liquid-crystal display panel of the past heated by generated heat.
Figure 13:
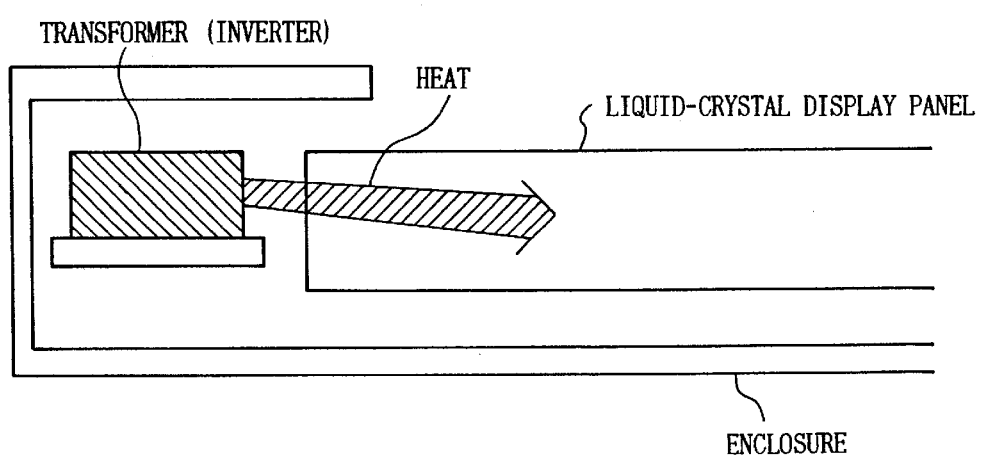
FIG. 13 is a drawing showing the transfer of heat in the past.

Another embodiment of the present invention is shown in FIG. 10.

In this embodiment, as shown in FIG. 10, the location of the inverter is changed, and it is possible even when the inverter is at the right or left of the liquid-crystal display panel to install a gasket so as to achieve the same type of effect as is achieved with the first embodiment of the present invention.

In this case as well, the gasket is installed near the lamp, so that the speed of temperature rise in the liquid-crystal display panel is made small, thereby preventing wrinkling of the reflective sheet.

If the drive circuit of the liquid-crystal display panel is in this region, the gasket also serves as a countermeasure against unwanted EMI.

In this manner, by providing a gasket so that it makes contact with the rear surface of the liquid-crystal display panel and the enclosure, it is possible to achieve the same type of effect as with the previously described embodiment.

By adopting the configuration described in detail above, a liquid-crystal display panel and heat control method therefor according to the present invention reduce the difference in thermal expansion rates caused by a difference in thermal capacities, thereby preventing the reflective sheet from striking the chassis and eliminating wrinkling of the reflective sheet, so as to prevent an abnormal display.

What is claimed is:

1. A liquid-crystal display device comprising:
    a liquid-crystal display panel;
    a light source provided in proximity to said liquid-crystal display panel for illuminating said liquid-crystal display panel;
    a transformer of said light source provided in proximity to said liquid-crystal display panel; and
    an enclosure for housing said liquid-crystal display panel, said light source and said transformer;
    wherein a gasket having a size approximately the same as the transformer is provided between said liquid-crystal display panel and said enclosure for controlling a thermal gradient of said liquid-crystal display panel.

2. A liquid-crystal display device according to claim 1, wherein said gasket is disposed in proximity to said light source.

3. A liquid-crystal display device according to claim 1, wherein said gasket is made of a foam material with resilience and covered with an electrically conductive material.

4. A liquid-crystal display device according to claim 1, wherein said gasket is adhered to a rear surface of the liquid display panel.

5. A liquid-crystal display device comprising:
    a liquid-crystal display panel;
    a light source provided in proximity to said liquid-crystal display panel for illuminating said liquid-crystal display panel;
    a transformer of said light source provided in proximity to said liquid-crystal display panel; and
    an enclosure for housing said liquid-crystal display panel, said light source and said transformer;
    wherein a gasket is provided between said liquid-crystal display panel and said enclosure for controlling a thermal gradient of said liquid-crystal display panel, wherein a thermal capacity of said gasket satisfies the following relationship:

$$\frac{Q'_4}{\frac{dT_4}{dt}} < C_4 \leq \frac{\int (Q_2 - Q_4 + Q'_4)dt}{\int \frac{dT_4}{dt} dt}$$

where $C_4$ is the thermal capacity of said enclosure, $Q_2$ is a heat flow between an air layer in said enclosure and said liquid-crystal display panel, $Q_4$ is a heat flow between said gasket and said enclosure, $Q'_4$ is a heat flow between said gasket and an air layer in said enclosure, and $T_4$ is a temperature of said gasket.

6. A liquid-crystal display device according to claim 5, wherein said gasket is disposed in proximity to said light source.

7. A liquid-crystal display device according to claim 5, wherein said gasket is made of a foam material with resilience and covered with an electrically conductive material.

8. A liquid-crystal display device according to claim 5, wherein said gasket is adhered to a rear surface of the liquid display panel.

9. A liquid-crystal display device according to claim 5, wherein said gasket has a size approximately the same as the transformer.

10. A liquid-crystal display device comprising:
    a liquid-crystal display panel;
    a light source provided in proximity to said liquid-crystal display panel for illuminating said liquid-crystal display panel;
    a transformer of said light source provided in proximity to said liquid-crystal display panel; and
    an enclosure for housing said liquid-crystal display panel, said light source and said transformer;
    wherein a gasket, made of a foam material with resilience and covered with an electrically conductive material, is provided between said liquid-crystal display panel and said enclosure for controlling a thermal gradient of said liquid-crystal display panel.

11. A liquid-crystal display device according to claim 10, wherein said gasket is disposed in proximity to said light source.

12. A liquid-crystal display device according to claim 10, wherein a thermal capacity of said gasket satisfies the following relationship:

$$\frac{Q'_4}{\frac{dT_4}{dt}} < C_4 \leq \frac{\int (Q_2 - Q_4 + Q'_4)dt}{\int \frac{dT_4}{dt} dt}$$

where $C_4$ is the thermal capacity of said enclosure, $Q_2$ is a heat flow between an air layer in said enclosure and said liquid-crystal display panel, $Q_4$ is a heat flow between said gasket and said enclosure, $Q'_4$ is a heat flow between said gasket and an air layer in said enclosure, and $T_4$ is a temperature of said gasket.

13. A liquid-crystal display device according to claim 10, wherein said gasket is adhered to a rear surface of the liquid display panel.

14. A liquid-crystal display device according to claim 10, wherein said gasket has a size approximately the same as the transformer.

* * * * *